United States Patent
Atsumi

(10) Patent No.: US 10,632,967 B2
(45) Date of Patent: Apr. 28, 2020

(54) VEHICLE ALARM SYSTEM

(71) Applicant: TOYOTA JIDOSHA KABUSHIKI KAISHA, Toyota-shi, Aichi-ken (JP)

(72) Inventor: Ryuta Atsumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/209,145

(22) Filed: Dec. 4, 2018

(65) Prior Publication Data

US 2019/0202404 A1 Jul. 4, 2019

(30) Foreign Application Priority Data

Dec. 28, 2017 (JP) ................................ 2017-253507

(51) Int. Cl.
*B60R 25/24* (2013.01)
*B60R 25/34* (2013.01)
*G07C 9/00* (2020.01)

(52) U.S. Cl.
CPC ............ *B60R 25/241* (2013.01); *B60R 25/34* (2013.01); *G07C 9/00896* (2013.01); *G07C 9/00309* (2013.01)

(58) Field of Classification Search
CPC ... B60R 25/241; B60R 25/34; G07C 9/00309; G07C 9/00896
See application file for complete search history.

(56) References Cited

U.S. PATENT DOCUMENTS

| | | | |
|---|---|---|---|
| 10,217,304 B2* | 2/2019 | Chen | G07C 9/00309 |
| 2013/0014213 A1* | 1/2013 | Suzuki | B60R 16/02 726/2 |
| 2014/0361889 A1* | 12/2014 | Wall, II | G08B 21/025 340/539.11 |
| 2018/0130327 A1* | 5/2018 | Rogers | G08B 21/028 |
| 2018/0261027 A1* | 9/2018 | Fujiwara | G07C 9/00309 |

FOREIGN PATENT DOCUMENTS

JP 2006-206225 A 8/2006

* cited by examiner

*Primary Examiner* — Omeed Alizada
(74) *Attorney, Agent, or Firm* — Oliff PLC

(57) ABSTRACT

A vehicle alarm system includes a first device mounted on a vehicle, and a second device mounted on the vehicle. The first device authenticates the second device by first wireless communication processing with the second device, detects that a state of the vehicle is changed in a predetermined pattern in a case where the second device is successfully authenticated, and outputs a predetermined alarm instruction when the first device detects that the first wireless communication processing is stopped. The second device authenticates a portable terminal device by second wireless communication processing with the portable terminal device, and performs the first wireless communication processing with the first device in a case where the portable terminal device is successfully authenticated. The first device causes the second device to stop the first wireless communication processing when the first device detects a predetermined first state change of the vehicle.

9 Claims, 6 Drawing Sheets

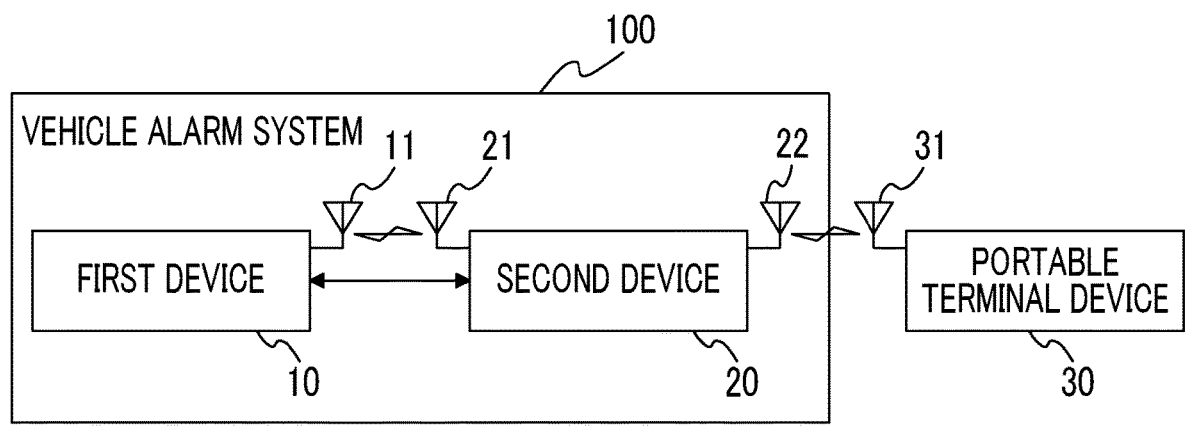
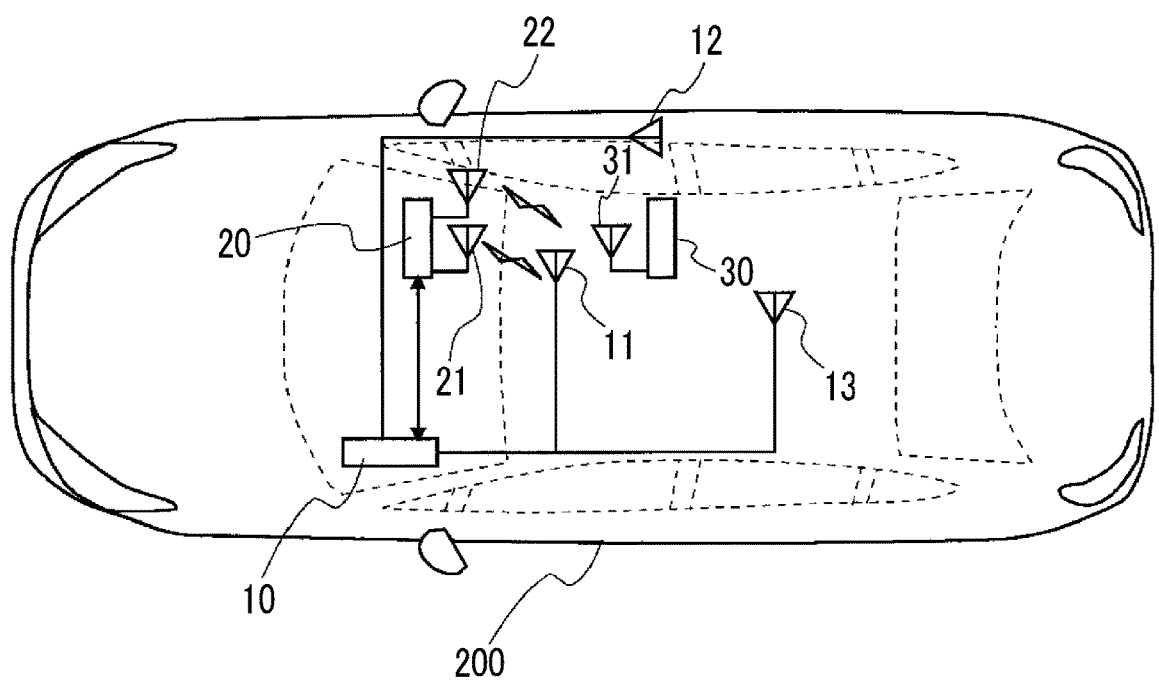

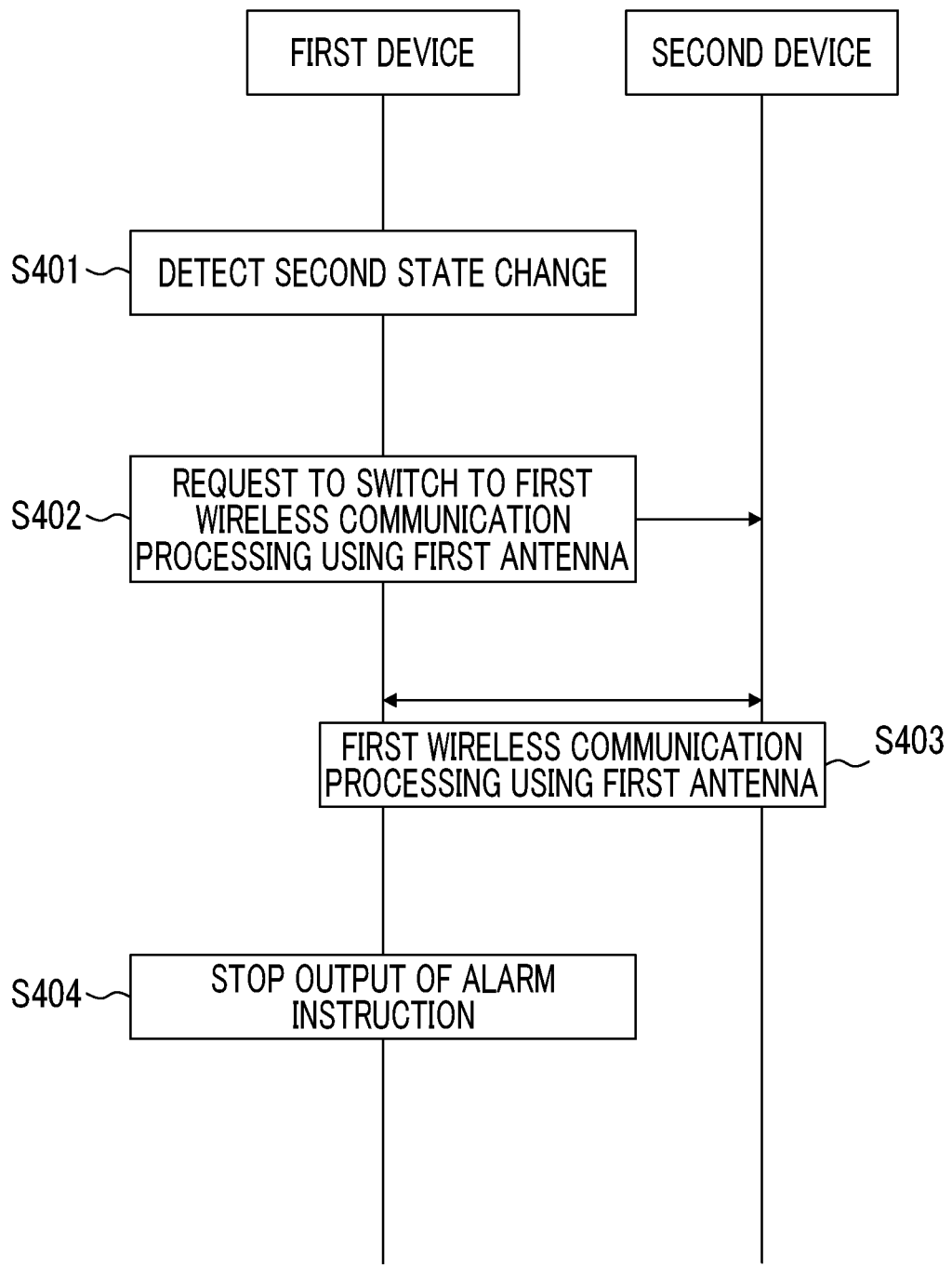

VEHICLE ALARM SYSTEM

INCORPORATION BY REFERENCE

The disclosure of Japanese Patent Application No. 2017-253507 filed on Dec. 28, 2017 including the specification, drawings and abstract is incorporated herein by reference in its entirety.

BACKGROUND

1. Technical Field

The present disclosure relates to a vehicle alarm system mounted on a vehicle or the like.

2. Description of Related Art

As an authentication system for a vehicle, a smart entry system is known. In the smart entry system, an in-vehicle device authenticates an electronic key carried by a user through short-range wireless communication with the electronic key, whereby the user is permitted to perform operations of the vehicle including unlocking and locking of a door of the vehicle, starting of an engine of the vehicle, or the like.

Meanwhile, a car sharing service for lending and borrowing vehicles between a plurality of users or a service for designating a vehicle as a delivery destination of a package (see Japanese Unexamined Patent Application Publication No. 2006-206225 (JP 2006-206225 A)) is disclosed. In the service as described above, however, a smart entry system takes extra time and effort of the users since an electronic key has to be delivered between the users.

In the vehicle equipped with the smart entry system in the related art, a device (key unit) having an electronic key function is fixedly mounted on the vehicle, and the electronic key function of the key unit is controlled through short-range wireless communication from a portable terminal device such as a smartphone with appropriate authority. With this, without delivering an electronic key, it is possible to make a portable terminal device carried by each user function as an electronic key. Since authorization to the portable terminal device can be executed, for example, by having the portable terminal device communicates with a service reservation server in advance and acquiring authentication information for controlling the key unit of the vehicle at a date and time at which a service is scheduled, it does not take extra time and effort compared to delivering of the electronic key.

SUMMARY

In the smart entry system, the in-vehicle device can detect whether the electronic key is inside or outside a vehicle cabin, based on whether or not radio waves are received from the electronic key by a plurality of antennas provided at a plurality of positions of the vehicle, or based on the intensity of the received radio waves. For example, in a case where the electronic key moves with the user from a driver's seat to the outside of the vehicle cabin in a state where an ignition switch is turned on, the in-vehicle device detects the movement of the electronic key and outputs an alarm by a meter, a buzzer, a lamp, or the like to alert the user and restrain the user from leaving the vehicle without turning off the ignition switch. However, as described above, when the key unit fixed to the vehicle is used instead of the electronic key, it is not possible to detect the movement of the user based on position detection of the electronic key, thus an alarm function as described above cannot be achieved.

The present disclosure provides a vehicle alarm system capable of achieving an alarm function even when movement of a user cannot be detected based on position detection of a device having an electronic key function.

A first aspect of the present disclosure relates to a vehicle alarm system including a first device mounted on a vehicle and a second device mounted on the vehicle. The first device is configured to authenticate the second device by first wireless communication processing with the second device. The first device is configured to detect that a state of the vehicle is changed in a predetermined pattern in a case where the second device is successfully authenticated. The first device is configured to output a predetermined alarm instruction when the first device detects that the first wireless communication processing is stopped. The second device is configured to authenticate a portable terminal device by second wireless communication processing with the portable terminal device. The second device is configured to perform the first wireless communication processing with the first device in a case where the portable terminal device is successfully authenticated. The first device is configured to cause the second device to stop the first wireless communication processing when the first device detects a predetermined first state change of the vehicle.

According to the first aspect of the present disclosure, it is possible to implement the alarm function of the smart entry system and the like by simulating the movement of the electronic key according to the state change of the vehicle.

In the vehicle alarm system according to the first aspect of the present disclosure, the first state change may indicate that a door of a driver's seat of the vehicle is changed from an open state to a closed state in a state where the vehicle is stopped, a shift lever is in a parking position, and an ignition switch is in a position other than an off position.

According to the first aspect of the present disclosure, it is possible to detect a state where it is highly likely that the user gets out of the vehicle without turning off the ignition switch.

In the vehicle alarm system according to the first aspect of the present disclosure, the first state change may indicate that a seating sensor provided in a driver's seat of the vehicle is changed from a seat-occupied detecting state to a seat-unoccupied detecting state in a state where an ignition switch is in a position other than an off position.

According to the first aspect of the present disclosure, it is possible to detect that the user gets out of the vehicle without turning off the ignition switch.

In the vehicle alarm system according to the first aspect of the present disclosure, the second device may be configured to measure a radio field intensity of a radio wave received from the portable terminal device. The first device may be configured to acquire the radio field intensity from the second device. The first state change may indicate that a door of a driver's seat of the vehicle is changed from an open state to a closed state and the radio field intensity is attenuated by a predetermined degree or more in a state where an ignition switch is in a position other than an off position.

According to the first aspect of the present disclosure, it is possible to detect that the user gets out of the vehicle without turning off the ignition switch.

In the vehicle alarm system according to the first aspect of the present disclosure, when the first device detects a predetermined second state change as a change pattern of a state of the vehicle after the first state change is detected, the first device may be configured to cause the second device to resume the first wireless communication processing, and to stop the output of the predetermined alarm instruction.

According to the first aspect of the present disclosure, it is possible to stop the alarm of the alarm function in the smart entry system and the like by simulating the movement of the electronic key in accordance with the state change of the vehicle.

In the vehicle alarm system according to the first aspect of the present disclosure, the second state change may indicate that at least one of the following states is established: that the vehicle is changed from a stopped state to a non-stopped state; that the shift lever is moved from a parking position to a position other than the parking position; or that a door of a driver's seat of the vehicle is changed from an open state to a closed state.

According to the first aspect of the present disclosure, it is possible to detect that the user occupies, or is highly likely to occupy the driver's seat.

In the vehicle alarm system according to the first aspect of the present disclosure, the second state change may indicate that a seating sensor provided in a driver's seat of the vehicle is changed from a seat-unoccupied detecting state to a seat-occupied detecting state.

According to the first aspect of the present disclosure, it is possible to detect that the user occupies the driver's seat.

In the vehicle alarm system according to the first aspect of the present disclosure, the second device may be configured to measure a radio field intensity of a radio wave received from the portable terminal device. The first device may be configured to acquire the radio field intensity from the second device. The second state change may indicate that a door of a driver's seat of the vehicle is changed from an open state to a closed state and the radio field intensity is increased by a predetermined degree or more.

According to the first aspect of the present disclosure, it is possible to detect that the user occupies the driver's seat.

A second aspect of the present disclosure relates to a vehicle alarm system including a first device mounted on a vehicle and a second device mounted on the vehicle. The first device includes a plurality of antennas including a first antenna and a second antenna. The first device is configured to authenticate the second device by first wireless communication processing with the second device using the antennas. In a case where the second device is successfully authenticated, the first device is configured to control output or stop of a predetermined alarm instruction based on a detection result when the first device detects that a state of the vehicle is changed with a predetermined change pattern of a vehicle state, and a state of the first wireless communication processing using the first antenna and a state of the first wireless communication processing using the second antenna are changed with a predetermined change pattern of a communication state. The second device is configured to authenticate a portable terminal device by second wireless communication processing with the portable terminal device. The second device is configured to perform first wireless communication processing with the first device in a case where the portable terminal device is successfully authenticated. The second device is configured to select to perform the first wireless communication processing via one or both of the first antenna and the second antenna. When the first device detects that the state of the vehicle is changed with the predetermined change pattern of the vehicle state, the first device is configured to instruct the second device to change the state of the first communication processing via the first antenna and the state of the first wireless communication processing via the second antenna with the predetermined change pattern of the communication state, based on the detection result.

According to the second aspect of the present disclosure, it is possible to implement the alarm function of the smart entry system and the like by simulating the movement of the electronic key according to the state change of the vehicle.

As described above, according to the aspects of the present disclosure, it is possible to provide a vehicle alarm system, even when the movement of the user cannot be detected based on the position detection of the electronic key, by estimating the movement of the user according to the state change of the vehicle and simulating the movement of the electronic key.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is a functional block diagram of a vehicle alarm system according to a first embodiment of the present disclosure;

FIG. 2 is a schematic layout diagram of the vehicle alarm system according to the first embodiment of the present disclosure;

FIG. 8 is a sequence diagram showing an example of alarm stop processing of the vehicle alarm system according to the second embodiment of the present disclosure.

DETAILED DESCRIPTION OF EMBODIMENTS

Outline

Figure 3:
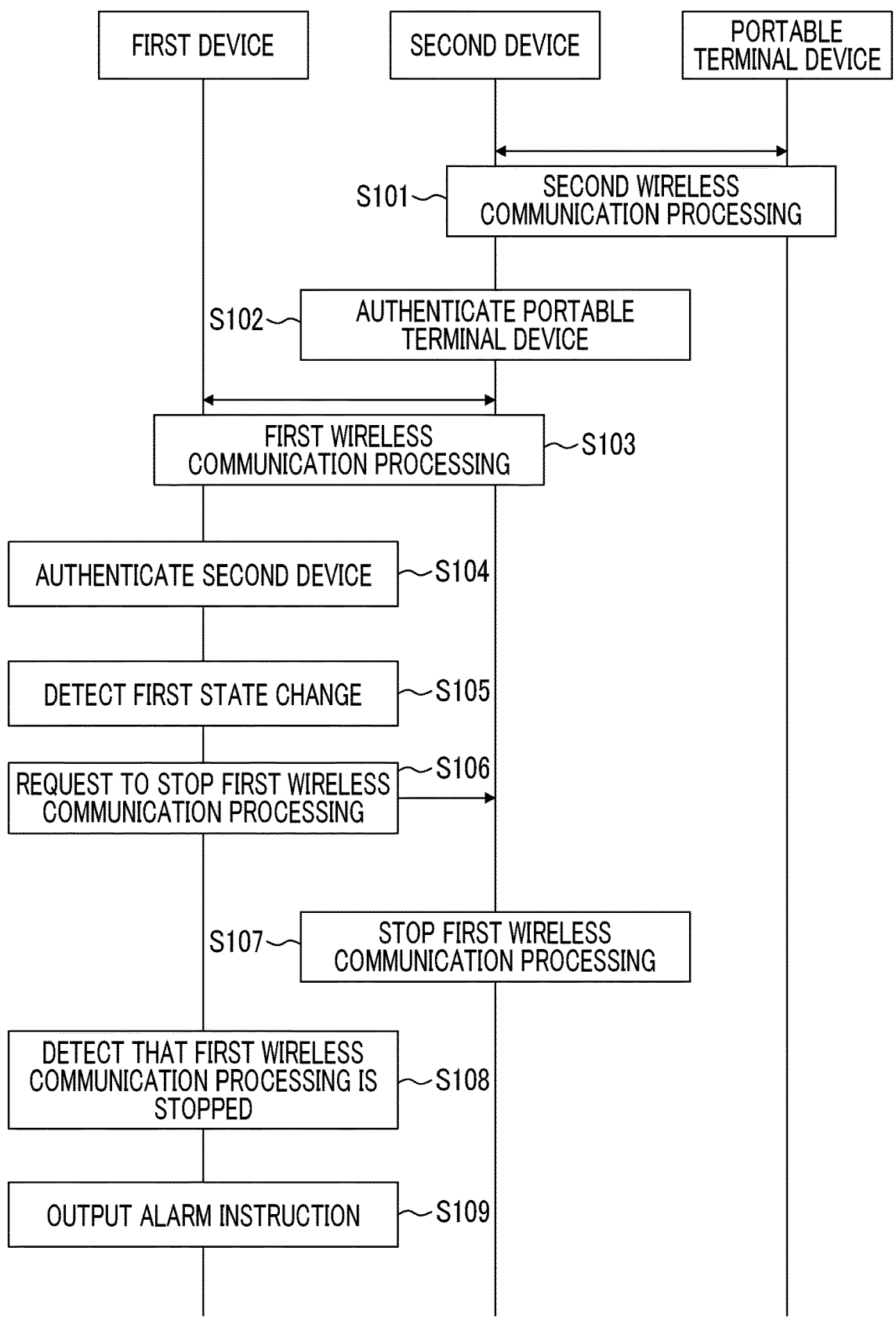
FIG. 3 is a sequence diagram showing examples of authentication processing and alarm output processing of the vehicle alarm system according to the first embodiment of the present disclosure.

A vehicle alarm system according to embodiments of the present disclosure can implement an alarm function of a smart entry system and the like by simulating the movement of an electronic key according to a state change of the vehicle.

First Embodiment

A first embodiment of the present disclosure will be described in detail with reference to the drawings.

Configuration

FIG. 1 shows a functional block diagram of a vehicle alarm system 100 and a portable terminal device 30 in the first embodiment. FIG. 2 shows a schematic layout diagram of the vehicle alarm system 100 in the first embodiment within a vehicle 200.

The vehicle alarm system 100 includes a first device 10 and a second device 20. The first device 10 corresponds to the aforementioned in-vehicle device, and the second device 20 corresponds to the aforementioned key unit. The first device 10 has an antenna 11. The second device 20 has antennas 21, 22. The portable terminal device 30 has an antenna 31. The first device 10 and the second device 20 perform short-range wireless communication (first wireless communication processing) via the antennas 11, 21, and the second device 20 and the portable terminal device 30 perform short-range wireless communication (second wireless communication processing) via the antennas 22, 31. As an example, the first device 10 and the second device 20 can be connected and exchange information by a wire. The first device 10 and the second device 20 are mounted on the vehicle 200, also include a power line and a control line (not shown), and are connected to other devices mounted on the vehicle 200. Thus, the first device 10 can acquire information such as a state of an ignition switch of the vehicle 200, a state of a shift lever, an opening and closing state of a door, or a seating state of a driver's seat, and can output an alarm instruction to allow a meter, a buzzer, a lamp, or the like of the vehicle 200 to give an alarm. In addition to the antenna 11 provided in the driver's seat, as the configuration of the smart entry system in the related art, the first device 10 may include an antenna 12 provided in the vicinity of a door handle or an antenna 13 provided in a rear seat, as shown in FIG. 2. However, in the first embodiment, the antenna 11 is solely used for wireless communication with the second device 20.

The portable terminal device 30 is a general-purpose terminal device such as a smartphone as an example, and performs short-range wireless communication of a Bluetooth (registered trademark) Low Energy (BLE) system with the second device 20 as an example. The portable terminal device 30 is, for example, a device owned by each user of car sharing, and it is assumed that the user gets in and out of the vehicle 200 in a state where the user carries the portable terminal device 30.

The wireless communication between the first device 10 and the second device 20 is partially carried out using antennas (not shown) separately provided, for example, for transmission and reception of radio waves from the second device 20 to the first device 10.

Processing

Processing performed by the vehicle alarm system 100 according to the first embodiment will be described. First, authentication processing and alarm output processing will be described. FIG. 3 is a sequence diagram showing an example of processing performed by the vehicle alarm system 100 and the portable terminal device 30. The sequence of FIG. 3 is initiated, for example, when the user carrying the portable terminal device 30 gets in the driver's seat of the vehicle 200.

Step S101: The second device 20 performs wireless communication (second wireless communication processing) with the portable terminal device 30. For example, the second device 20 receives authentication information for authenticating the portable terminal device 30.

Step S102: The second device 20 authenticates the portable terminal device 30 based on the wireless communication result. In a case where the authentication is failed, the sequence of FIG. 3 is canceled.

The processing in steps S101 and S102 is periodically performed in parallel with the subsequent processing, and authentication of the portable terminal device 30 by the second device 20 is periodically performed.

Step S103: The second device 20 performs wireless communication (first wireless communication processing) with the first device 10. For example, the first device 10 receives authentication information for authenticating the second device 20.

Step S104: The first device 10 authenticates the second device 20 based on the wireless communication result. Since the second device 20 is an in-vehicle device holding authorized authentication information in advance, authentication failure due to inconsistency of authentication information cannot happen. When the second device 20 is authenticated, vehicle operation by the user such as engine start operation of the vehicle is permitted.

The authentication processing in steps S103 and S104 is periodically performed in parallel with the subsequent processing, and authentication of the second device 20 by the first device 10 is periodically performed.

Step S105: The first device 10 detects a first state change which is a predetermined state change of the vehicle 200. The first state change indicates, for example, a state change that determination can be made that the user occupying the driver's seat gets out of the vehicle 200 without turning off the ignition switch, or it is highly likely that the user occupying the driver's seat gets out of the vehicle 200 without turning off the ignition switch. Examples of the first state change will be described below, but the combination or rearrangement of these state changes may be defined as the first state change.

Example 1 of First State Change

In this example, the first state change indicates that the door of the driver's seat of the vehicle 200 is changed from an open state to a closed state in a state where the vehicle 200 is stopped, the shift lever is in the parking position, and the ignition switch is in a position other than an off position. Alternatively, the first state change may further include a state that a door handle of the door of the driver's seat is touched thereafter.

Example 2 of First State Change

In this example, the first state change indicates that a seating sensor provided in the driver's seat of the vehicle 200 is changed from a seat-occupied detecting state to a seat-unoccupied detecting state in a state where the ignition switch is in a position other than an off position.

Example 3 of First State Change

In this example, it is assumed that the second device 20 can measure a radio field intensity of a communication radio wave received from the portable terminal device 30 in the second wireless communication processing, and the first device 10 can acquire the radio field intensity measured by the second device 20. In this example, the first state change indicates that the door of the driver's seat of the vehicle 200 is changed from the open state to the closed state and the radio field intensity received from the portable terminal device 30 is attenuated by a predetermined degree or more from a point before the door shifts to the open state to a point after the door shifts to the closed state in a state where the ignition switch is in a position other than an off position.

Step S106: The first device 10 requests the second device 20 to stop the first wireless communication processing. For example, the request is transmitted from the first device 10 to the second device 20 through wired communication.

Step S107: The second device 20 stops the first wireless communication processing. It is performed, for example, by stopping the second device 20 from transmitting a radio wave to the first device 10. This indicates that, in the smart entry system, the second device 20 simulates that the state is changed from a state in which the electronic key is in the driver's seat and communicates with the first device 10, to a state in which the electronic key moves outside the vehicle cabin, is separated from the vehicle 200, and cannot communicate with the first device 10.

Step S108: The first device 10 detects that the first wireless communication processing is stopped because the radio wave for the first wireless communication processing cannot be received, for example.

Step S109: The first device 10 outputs an alarm instruction instructing to output an alarm to the meter, the buzzer, the lamp, or the like of the vehicle 200.

Consequently, in the vehicle 200 equipped with the smart entry system, even when the vehicle alarm system 100 cannot detect the movement of the user based on the position detection of the electronic key, it is possible to implement, for example, the alarm function in a case where the user gets out of the vehicle while leaving the ignition switch on, or the like.

Figure 4:
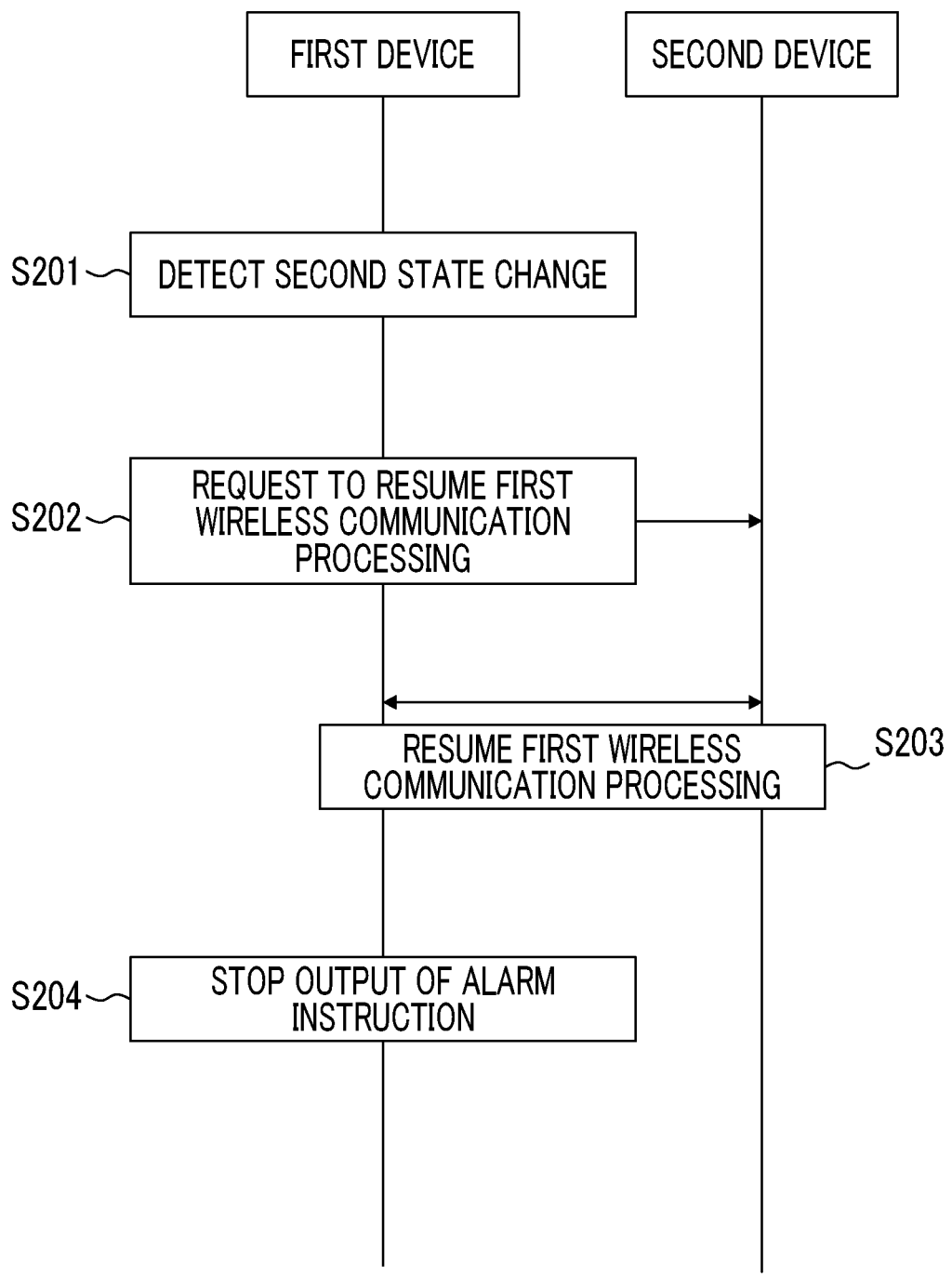
FIG. 4 is a sequence diagram showing an example of alarm stop processing of the vehicle alarm system according to the first embodiment of the present disclosure.

Alarm stop processing performed by the vehicle alarm system 100 will be described. FIG. 4 is a sequence diagram showing an example of processing performed by the vehicle alarm system 100. The sequence of FIG. 4 is subsequently performed from step S109 described above.

Step S201: The first device 10 detects a second state change which is a predetermined state change of the vehicle 200. The second state change indicates, for example, a state change that determination can be made that the user who notices the alarm returns to the driver's seat or it is highly likely that the user who notices the alarm returns to the driver's seat, or alternatively, the user does not get out of the vehicle. Examples of the second state change will be described below, but the combination or rearrangement of these state changes may be defined as the second state change.

Example 1 of Second State Change

In this example, the second state change indicates that at least one of the following states is established: that the vehicle 200 is changed from the stopped state to the non-stopped state, for example, a state of traveling at 5 km/h or higher; that the shift lever is moved from the parking position to a position other than the parking position; or that the door of the driver's seat of the vehicle 200 is changed from the closed state to the open state.

Example 2 of Second State Change

In this example, the second state change indicates that the seating sensor provided in the driver's seat of the vehicle 200 is changed from the seat-unoccupied detecting state to the seat-occupied detecting state.

Example 3 of Second State Change

In this example, it is assumed that the second device 20 can measure the radio field intensity of the communication radio wave received from the portable terminal device 30 in the second wireless communication processing, and the first device 10 can acquire the radio field intensity measured by the second device 20. In this example, the second state change indicates that the door of the driver's seat of the vehicle 200 is changed from the open state to the closed state and the radio field intensity received from the portable terminal device 30 is increased by a predetermined degree or more from a point before the door shifts to the open state to a point after the door shifts to the closed state.

Step S202: The first device 10 requests the second device 20 to resume the first wireless communication processing. For example, the request is transmitted from the first device 10 to the second device 20 through wired communication.

Step S203: The second device 20 resumes the first wireless communication processing with the first device 10. The processing is resumed, for example, by the second device 20 transmitting the radio wave again to the first device 10. This indicates that in the smart entry system, the second device 20 simulates that the state is changed from a state in which the electronic key is in a position separated from the vehicle 200 outside the vehicle cabin and cannot communicate with the first device 10, to a state in which the electronic key moves to the driver's seat in the vehicle cabin and can communicate with the first device 10.

Step S204: The first device 10 stops output of the alarm instruction. Alternatively, the first device 10 outputs an instruction to stop the alarm.

Consequently, in the vehicle 200 equipped with the smart entry system, even when the vehicle alarm system 100 cannot detect the movement of the user based on the position detection of the electronic key, it is possible to implement, for example, an alarm stop function in a case where the user returns to the driver's seat or the like.

Second Embodiment

A second embodiment of the present disclosure will be described in detail with reference to the drawings.

Configuration

Figure 5:
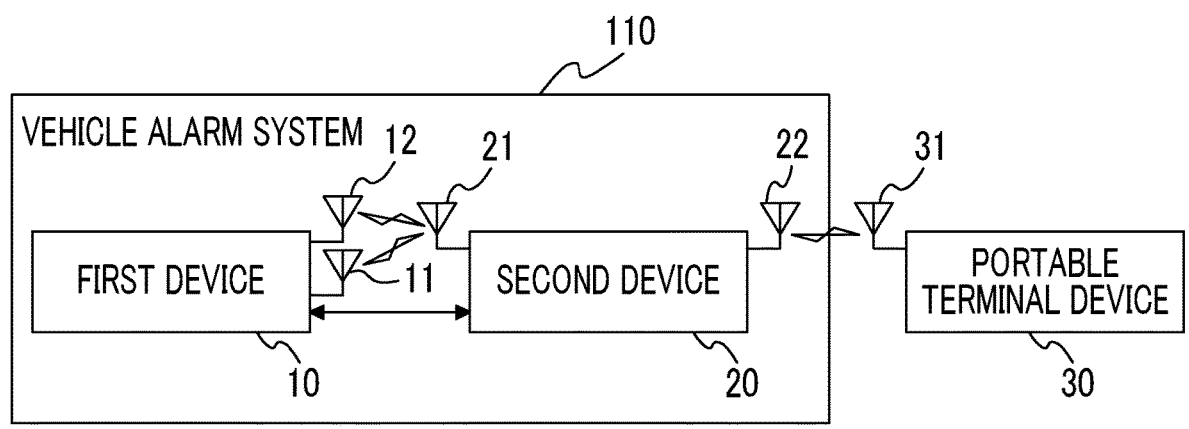
FIG. 5 is a functional block diagram of a vehicle alarm system according to a second embodiment of the present disclosure.
Figure 6:
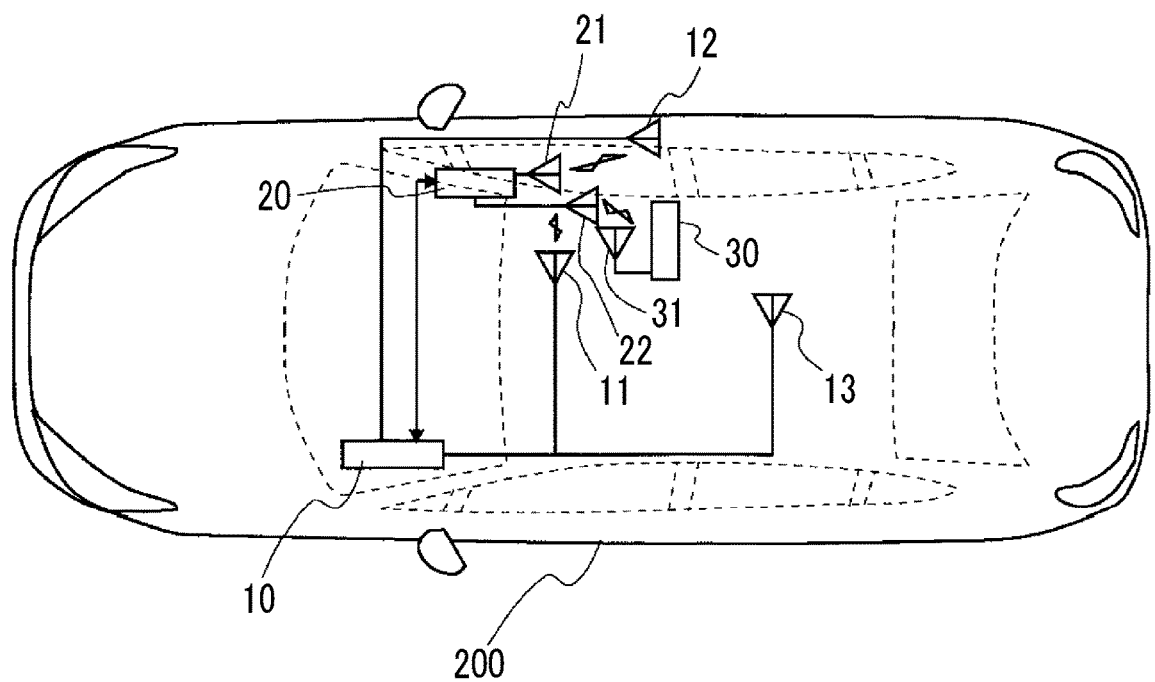
FIG. 6 is a schematic layout diagram of the vehicle alarm system according to the second embodiment of the present disclosure.

FIG. 5 shows a functional block diagram of a vehicle alarm system 110 and a portable terminal device 30 in the second embodiment. FIG. 6 shows a schematic layout diagram of the vehicle alarm system 110 in the second embodiment within a vehicle 200.

The vehicle alarm system 110 is different from the vehicle alarm system 100 of the first embodiment in that a first device 10 and a second device 20 communicate with each other using a first antenna 11 provided in the driver's seat and a second antenna 12 provided in the vicinity of a door handle of a driver's seat side door. As shown in FIG. 6, the second device 20 is installed at a position where an antenna 21 can receive radio waves from the first antenna 11 and the second antenna 12. In the first wireless communication processing described above, the second device 20 can determine, for example, whether the communication radio wave received from the first device 10 is transmitted from the first antenna 11 or the second antenna 12 based on a frequency of a radio wave, a transmission timing, a radio field intensity, or the like. Accordingly, it is possible to individually switch whether or not to transmit a response to the communication radio waves received from the first antenna 11 and the second antenna 12, and thus, the second device 20 can switch whether to perform the first wireless communication processing with the first device 10 using one or both of the first antenna 11 and the second antenna 12 or not to perform the first wireless communication processing.

Processing

Figure 7:
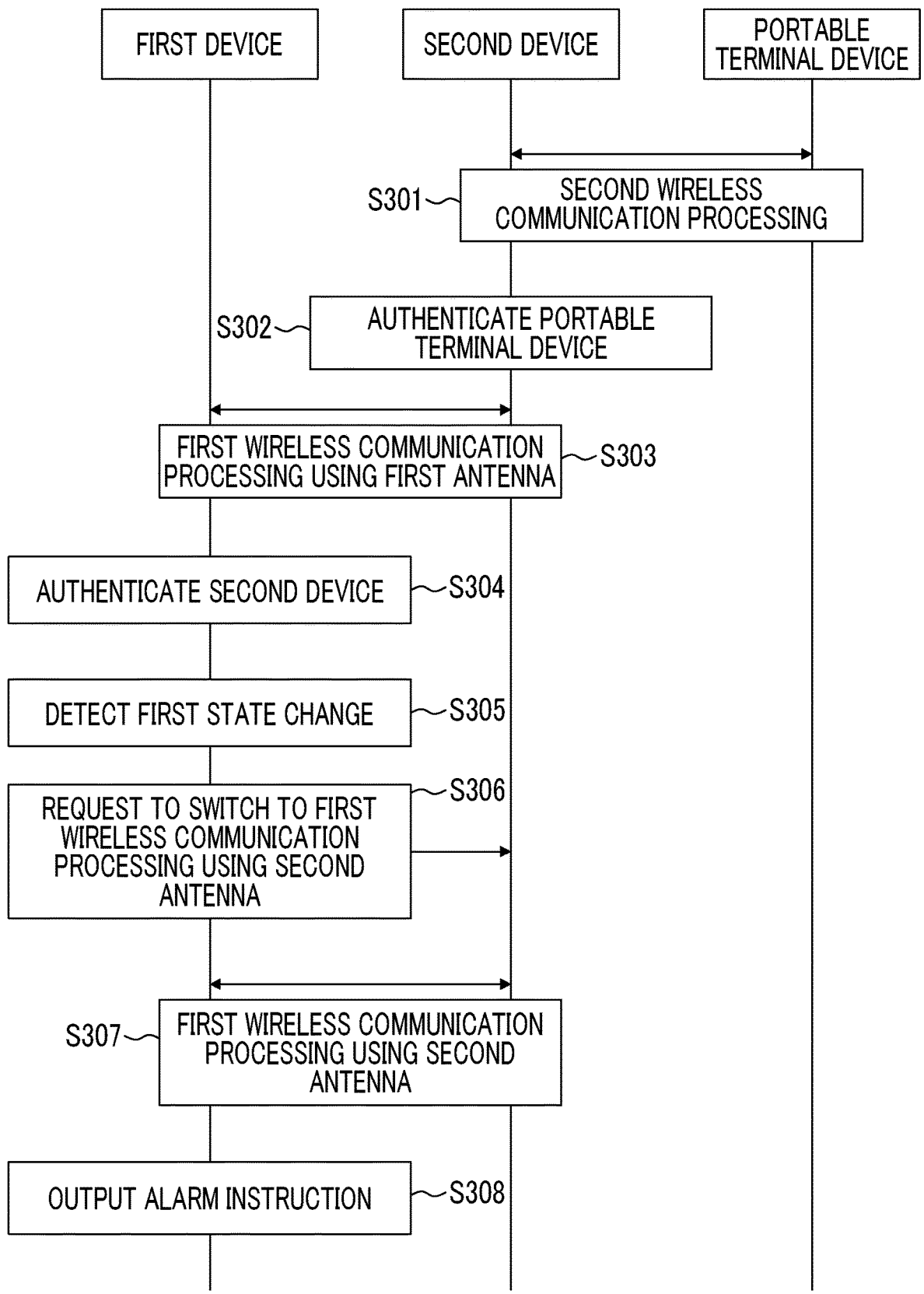
FIG. 7 is a sequence diagram showing examples of authentication processing and alarm output processing of the vehicle alarm system according to the second embodiment of the present disclosure.

Processing performed by the vehicle alarm system 110 according to the second embodiment will be described. First, authentication processing and alarm output processing will be described. FIG. 7 is a sequence diagram showing an example of processing performed by the vehicle alarm system 110 and the portable terminal device 30.

Step S301: The second device 20 performs wireless communication (second wireless communication processing) with the portable terminal device 30. For example, the second device 20 receives authentication information for authenticating the portable terminal device 30.

Step S302: The second device 20 authenticates the portable terminal device 30 based on the wireless communication result. In a case where the authentication is failed, the sequence of FIG. 7 is canceled.

In the same manner as in steps S101 and S102 in the first embodiment, the processing in steps S301 and S302 is performed periodically in parallel with the subsequent processing, and the authentication of the portable terminal device 30 by the second device 20 is periodically performed.

Step S303: The second device 20 performs wireless communication (first wireless communication processing) with the first device 10. For example, the first device 10 receives authentication information for authenticating the second device 20. Here, as an example, the first device 10 performs the first wireless communication processing using the first antenna 11.

Step S304: The first device 10 authenticates the second device 20 based on the wireless communication result. When the second device 20 is authenticated, vehicle operation by the user such as engine start operation of the vehicle is permitted.

In the same manner as in steps S103 and S104 in the first embodiment, the authentication processing in steps S303 and S304 is performed periodically in parallel with the subsequent processing, and the authentication of the second device 20 by the first device 10 is periodically performed.

Step S305: The first device 10 detects a first state change which is a predetermined state change of the vehicle 200. Similar to the first embodiment, the first state change indicates, for example, a state change that determination can be made that it is highly likely that the user occupying the driver's seat gets out of the vehicle without turning off the ignition switch.

Step S306: The first device 10 requests the second device 20 to switch and perform the first wireless communication processing from the first antenna 11 to the second antenna 12. For example, the request is transmitted from the first device 10 to the second device 20 through wired communication.

Step S307: The second device 20 switches the antenna used for the first wireless communication processing from the first antenna 11 to the second antenna 12. The first device 10 detects that the state of the first wireless communication processing is changed and the processing is being performed using the second antenna 12. This detection indicates that in the smart entry system, the second device 20 simulates that the state is changed from the state in which the electronic key is in the driver's seat and communicates with the first device 10 using the first antenna 11, to the state in which the electronic key moves outside the vehicle cabin, is in the vicinity of the driver's seat side door, and communicates with the first device 10 using the second antenna 12.

In the above description, the example in which the switching request of the antenna is output from the first device to the second device has been described, but the following method can also be implemented. For example, the second device 20 monitors the state of the first device 10, and the second device 20 itself may perform control for switching the antenna in response to the fact that the first device performs the process of S305.

Step S308: The first device 10 outputs an alarm instruction instructing to output an alarm to the meter, the buzzer, the lamp, or the like of the vehicle 200.

Consequently, in the vehicle 200 equipped with the smart entry system, even when the vehicle alarm system 110 cannot detect the movement of the user based on the position detection of the electronic key, for example, it is possible to implement the alarm function in a case where the user gets out of the vehicle while leaving the ignition switch on, or the like.

Stop processing of the alarm output performed by the vehicle alarm system 110 will be described. FIG. 8 is a sequence diagram showing an example of processing performed by the vehicle alarm system 110. The sequence of FIG. 8 is subsequentry performed from step S308 described above.

Step S401: The first device 10 detects a second state change which is a predetermined state change of the vehicle 200. Similar to the first embodiment, the second state change indicates, for example, a state change that determination can be made that it is highly likely that the user who notices the alarm returns to the driver's seat again.

Step S402: The first device 10 requests the second device 20 to switch and perform the first wireless communication processing from the second antenna 12 to the first antenna 11. For example, the request is transmitted from the first device 10 to the second device 20 through wired communication.

Step S403: The second device 20 switches the antenna used for the first wireless communication processing from the second antenna 12 to the first antenna 11. The first device 10 detects that the state of the first wireless communication processing is changed and the processing is being performed using the first antenna 11. This detection indicates that in the smart entry system, the second device 20 simulates that the state is changed from the state in which the electronic key is in the vicinity of the driver's seat side door and outside the vehicle cabin and communicates with the first device 10 using the second antenna 12, to the state in which the electronic key moves to the driver's seat in the vehicle cabin, and communicates with the first device 10 using the first antenna 11.

Step S404: The first device 10 stops output of the alarm instruction. Alternatively, the first device 10 outputs an instruction to stop the alarm.

Consequently in the vehicle 200 equipped with the smart entry system, even when vehicle alarm system 110 cannot detect the movement of the user based on the position detection of the electronic key, it is possible to implement, for example, an alarm stop function in a case where the user returns to the driver's seat or the like. Especially, in the second embodiment compared with the first embodiment, it is possible to more explicitly simulate that the electronic key is positioned in the vicinity of the driver's seat side door and outside the vehicle cabin. In the first wireless communication processing, the first device 10 and the second device 20 may perform communication using antennas provided at other positions, such as the antenna 13 provided in the rear seat in addition to the first antenna 11 provided in the driver's seat and the second antenna 12 provided in the vicinity of the door handle of the driver's seat side door, or instead of the first antenna 11 and the second antenna 12. Accordingly, it is possible to appropriately change or expand the simulation range of the movement of the electronic key appropriately associated with the state change of the vehicle. The pattern is not limited as long as it is possible to control the output of the alarm and the stop of the output of the alarm according to a change in the combination pattern for which one of the antennas is used for the first wireless communication processing and which one is not used.

The embodiments of the present disclosure have been described above, however, an applicable embodiment of the present disclosure is not limited to the aforementioned embodiments, and can be implemented with appropriate modifications. For example, in addition to the case where the user sitting in the driver's seat gets out of the vehicle without turning off the ignition switch, as long as the sensor or the like provided in each part of the vehicle can detect occurrence of the aforementioned case with required accuracy, it is possible to use the alarm function of the smart entry system by simulating the movement of the electronic key assumed in the aforementioned case as in the embodiment.

Effect

As described above, according to the embodiments of the present disclosure, even when the function block equivalent to the electronic key is fixed and the movement of the user cannot be detected based on the position detection of the electronic key, it is possible to implement the alarm function of the smart entry system and the like by estimating the movement of the user and simulating the movement of the electronic key according to the state change of the vehicle.

An applicable embodiment of the present disclosure is not limited to the vehicle alarm system, and can also be regarded as each part of the vehicle alarm system, or as an alarm control program for a vehicle that describes an alarm control method for a vehicle executed by one or more computers having a processor and memory constituting each part or processing of the alarm control method.

The present disclosure is useful for an alarm system of a vehicle and the like.

What is claimed is:

1. A vehicle alarm system comprising:
a first device mounted on a vehicle; and
a second device mounted on the vehicle, wherein:
the first device is configured to authenticate the second device by first wireless communication processing with the second device;
the first device is configured to detect that a state of the vehicle is changed in a predetermined pattern in a case where the second device is successfully authenticated, and to output a predetermined alarm instruction when the first device detects that the first wireless communication processing is stopped;
the second device is configured to authenticate a portable terminal device by second wireless communication processing with the portable terminal device;
the second device is configured to perform the first wireless communication processing with the first device in a case where the portable terminal device is successfully authenticated; and
the first device is configured to cause the second device to stop the first wireless communication processing when the first device detects a predetermined first state change of the vehicle.

2. The vehicle alarm system according to claim 1, wherein the first state change indicates that a door of a driver's seat of the vehicle is changed from an open state to a closed state in a state where the vehicle is stopped, a shift lever is in a parking position, and an ignition switch is in a position other than an off position.

3. The vehicle alarm system according to claim 1, wherein the first state change indicates that a seating sensor provided in a driver's seat of the vehicle is changed from a seat-occupied detecting state to a seat-unoccupied detecting state in a state where an ignition switch is in a position other than an off position.

4. The vehicle alarm system according to claim 1, wherein:
the second device is configured to measure a radio field intensity of a radio wave received from the portable terminal device;
the first device is configured to acquire the radio field intensity from the second device; and
the first state change indicates that a door of a driver's seat of the vehicle is changed from an open state to a closed state and the radio field intensity is attenuated by a predetermined degree or more in a state where an ignition switch is in a position other than an off position.

5. The vehicle alarm system according to claim 1, wherein when the first device detects a predetermined second state change as a change pattern of a state of the vehicle after the first state change is detected, the first device is configured to cause the second device to resume the first wireless communication processing, and to stop the output of the predetermined alarm instruction.

6. The vehicle alarm system according to claim 5, wherein the second state change indicates that at least one of following states is established: that the vehicle is changed from a stopped state to a non-stopped state; that a shift lever is moved from a parking position to a position other than the parking position; or that a door of a driver's seat of the vehicle is changed from an open state to a closed state.

7. The vehicle alarm system according to claim 5, wherein the second state change indicates that a seating sensor provided in a driver's seat of the vehicle is changed from a seat-unoccupied detecting state to a seat-occupied detecting state.

8. The vehicle alarm system according to claim 5, wherein:
the second device is configured to measure a radio field intensity of a radio wave received from the portable terminal device;
the first device is configured to acquire the radio field intensity from the second device; and
the second state change indicates that a door of a driver's seat of the vehicle is changed from an open state to a closed state and the radio field intensity is increased by a predetermined degree or more.

9. A vehicle alarm system comprising:
a first device mounted on a vehicle; and
a second device mounted on the vehicle, wherein:
the first device includes a plurality of antennas including a first antenna and a second antenna;
the first device is configured to authenticate the second device by first wireless communication processing with the second device using the antennas;

in a case where the second device is successfully authenticated, the first device is configured to control output or stop of a predetermined alarm instruction based on a detection result when the first device detects that a state of the vehicle is changed with a predetermined change pattern of a vehicle state, and a state of the first wireless communication processing using the first antenna and a state of the first wireless communication processing using the second antenna are changed with a predetermined change pattern of a communication state;

the second device is configured to authenticate a portable terminal device by second wireless communication processing with the portable terminal device;

the second device is configured to perform first wireless communication processing with the first device in a case where the portable terminal device is successfully authenticated;

the second device is configured to select to perform the first wireless communication processing via one or both of the first antenna and the second antenna; and when the first device detects that the state of the vehicle is changed with the predetermined change pattern of the vehicle state, the first device is configured to instruct the second device to change the state of the first wireless communication processing via the first antenna and the state of the first wireless communication processing via the second antenna with the predetermined change pattern of the communication state, based on the detection result.

* * * * *